US012400789B2

(12) United States Patent
He et al.

(10) Patent No.: US 12,400,789 B2
(45) Date of Patent: Aug. 26, 2025

(54) MULTI-DEGREE-OF-FREEDOM CONDUCTOR AUTOMATIC DEPOSITING SYSTEM FOR TOKAMAK TOROIDAL FIELD COIL WINDING PACKS

(71) Applicants: Hefei Institutes of Physical Sciences, Chinese Academy of Sciences, Anhui (CN); Institute of Energy, Hefei Comprehensive National Science Center ( Anhui Province Energy Laboratory ), Anhui (CN)

(72) Inventors: Jian He, Anhui (CN); Wei Wen, Anhui (CN); Zhaohui Yan, Anhui (CN); Yu Wu, Anhui (CN); Chao Zhou, Anhui (CN)

(73) Assignees: Hefei Institutes of Physical Sciences, Chinese Academy of Sciences, Anhui (CN); Institute of Energy, Hefei Comprehensive National Science Center (Anhui Province Energy Laboratory), Anhui (CN)

( * ) Notice: Subject to any disclaimer, the term of this patent is extended or adjusted under 35 U.S.C. 154(b) by 31 days.

(21) Appl. No.: 18/801,230

(22) Filed: Aug. 12, 2024

(65) Prior Publication Data

US 2025/0062069 A1 Feb. 20, 2025

(30) Foreign Application Priority Data

Aug. 17, 2023 (CN) ......................... 202311035477.9

(51) Int. Cl.
*H01F 41/06* (2016.01)
*G21B 1/05* (2006.01)

(52) U.S. Cl.
CPC ............ *H01F 41/06* (2013.01); *G21B 1/057* (2013.01)

(58) Field of Classification Search
CPC ...... H01F 41/048; H01F 41/06; H01F 41/082; H01F 41/084; H01F 41/092; H01F 41/096; H01F 6/06; G21B 1/057
See application file for complete search history.

(56) References Cited

U.S. PATENT DOCUMENTS 3,212,947 A * 10/1965 Vanzo .................... B29D 30/48 156/422
3,566,654 A * 3/1971 Adams et al. .......... B21C 47/04 72/170

(Continued)

OTHER PUBLICATIONS

CN 109273244A, Chen et al. Jan. 2019.*
KR 100683132B1, Park et al. Feb. 2007.*
WO 2006/072635A2, Boye et al. Jul. 2006.*

*Primary Examiner* — Edward T Tolan
(74) *Attorney, Agent, or Firm* — Seed IP Law Group LLP

(57) ABSTRACT

The present invention provides a multi-degree-of-freedom conductor depositing system for tokamak toroidal field coil winding packs, belongs to the field of development of toroidal field superconducting coils for nuclear fusion. The multi-degree-of-freedom conductor depositing system is mounted on a winding table and distributed along the contour of the toroidal field coil. The optical proximity switches detect the position signals between the winding table and the bending unit and transmit them to an automatic control system. The multi-degree-of-freedom conductor depositing system is distributed in a spiral shape from the top to the bottom from the position of the bending unit along the direction of coil winding. The conductor is deposited onto the track drive mechanism of the multi-degree-of-freedom conductor depositing device, which has a bidirectional moving and rotating function. This avoids the risk of insulation rupture due to friction between the conductor and the depositing tooling during the coil winding process. It (Continued)

also has the advantages of simple structure, convenient operation and high reliability.

5 Claims, 2 Drawing Sheets

(56) References Cited

U.S. PATENT DOCUMENTS

| | | | | | |
|---|---|---|---|---|---|
| 4,114,432 | A * | 9/1978 | Miura | H01F 41/082 72/169 |
| 4,872,618 | A * | 10/1989 | Sato | H01F 41/08 29/605 |
| 6,758,078 | B2 * | 7/2004 | Wells | A47C 23/04 72/134 |
| 10,978,247 | B2 * | 4/2021 | Song | H01F 41/074 |
| 11,581,134 | B2 * | 2/2023 | Song | H01F 41/048 |
| 2007/0012083 | A1 * | 1/2007 | Iwashita | B21D 24/10 72/350 |
| 2009/0007617 | A1 * | 1/2009 | Suzuki | B21D 24/10 72/20.1 |

* cited by examiner

MULTI-DEGREE-OF-FREEDOM CONDUCTOR AUTOMATIC DEPOSITING SYSTEM FOR TOKAMAK TOROIDAL FIELD COIL WINDING PACKS

BACKGROUND

Technical Field

The present invention relates to the field of development of toroidal field superconducting coils for nuclear fusion, and specifically relates to A multi-degree-of-freedom conductor automatic depositing system for tokamak toroidal field coil winding packs.

Description of the Related Art

Fusion energy is regarded as the ultimate energy source for human beings. Nuclear fusion is divided into three types: inertial confinement fusion, gravity confinement fusion and magnetic confinement fusion. Of these, gravity confinement fusion cannot be realized on Earth at present. The international research community is generally focused on inertial confinement fusion and magnetic confinement fusion. The magnetic confinement fusion device is regarded as the optimal apparatus for humans to harness fusion energy. The magnet system represents a pivotal component within the magnetic confinement fusion device. The performance parameters of magnetic confinement fusion devices are proportional to the third power of the plasma radius, with the distribution radius and magnetic field strength of superconducting magnets being the decisive factors. The future trend in the development of fusion magnets is towards larger superconducting coil sizes, stronger magnetic field strengths and more stable operation. CICC is applied in the design and development of fusion superconducting magnets by domestic and foreign counterparts due to its excellent mechanical properties, good cooling channels and mature manufacturing process.

The development of CICC superconducting coils with superconducting material NbTi necessitates the completion of a series of manufacturing processes, including coil winding and turn insulation wrapping, joint manufacturing, and vacuum pressure impregnation. The development of CICC superconducting coils made of superconducting material Nb3Sn typically necessitates the completion of a series of manufacturing processes, including coil winding, joint manufacturing, heat treatment, turn insulation wrapping, and vacuum pressure impregnation. These processes must be conducted in unison with the coil winding.

The CICC is released, straightened, ultrasonically cleaned and sandblasted, and then precisely and tension-free wound into shape under the established winding process. The height of the bending unit to the winding table is usually set at 600 mm, which facilitates helium tube manufacturing and non-destructive testing. The formed CICC is gradually deposited from the bending machine to the winding table by means of the depositing system. The traditional method is to use a single support roller as the depositing device, and manually control the height of the elevator module to achieve the spiral depositing of the CICC. This method is inefficient and requires manual lifting and depositing, and due to the large error in manually controlling the height of each support roller, it is easy to cause the CICC to be in a non-spiral state in the process of depositing, which may lead to the plastic deformation of the CICC and affect the precision of coil winding. Concurrently, the CICC undergoes a sudden change in radius during the winding process. This change in pressure results in the completion of the wound CICC on the depositing device along the radial movement. The traditional support roller depositing device lacks the functionality to move along the radial direction, thereby affecting the precision winding of the coil. Due to the substantial self-weight of the CICC, the line contact between the traditional support roller and the insulation-wrapped CICC may result in insulation rupture, which could compromise the electrical insulation strength and mechanical strength of the magnet.

BRIEF SUMMARY

In order to address the aforementioned issues, the present invention provides a multi-degree-of-freedom conductor automatic depositing system for tokamak toroidal field coil winding packs. This system enables the automatic lifting and lowering of the CICC depositing process. This significantly enhances the degree of automation and reduces the labor intensity of the operators. The crawler conveyor structure performs the function of radial and circumferential movement of the CICC after bending and insulation wrapping during the depositing process, thus avoiding the risk of insulation rupture caused by line contact movement and rolling between the CICC and support roller. It offers the advantages of high degree of automation, simple structure, convenient operation and high reliability.

In order to achieve the aforementioned objective, the present invention employs the following technical solutions:

the multi-degree-of-freedom conductor automatic depositing system for tokamak toroidal field coil winding packs comprises: a conductor bending unit, a winding table, multi-degree-of-freedom conductor depositing devices, limiting moulds, and an automatic control system; the conductor bending unit bends and forms the cable-in-conduit conductor (CICC) continuously; the winding table moves along the forming wheels of the conductor bending unit to carry the formed conductor; the multi-degree-of-freedom conductor depositing devices comprise: lift drive system, radial movement mechanisms, circumferential rotation mechanisms, lifter modules and tracked circumferential movement mechanisms; the lift drive system lifts the lifter module; the radial movement mechanism moves the CICC in a radial direction; the tracked circumferential movement mechanism moves the CICC in a circle while keeping it from moving in any other direction; the tracked ring direction moving mechanism is mounted on the circumferential rotation mechanism, which is mounted on the radial movement mechanism; the automatic control system controls the lifter module, which lifts the CICC from the conductor bending unit to the inlet, which allows the CICC to drop freely.

Figure 1:
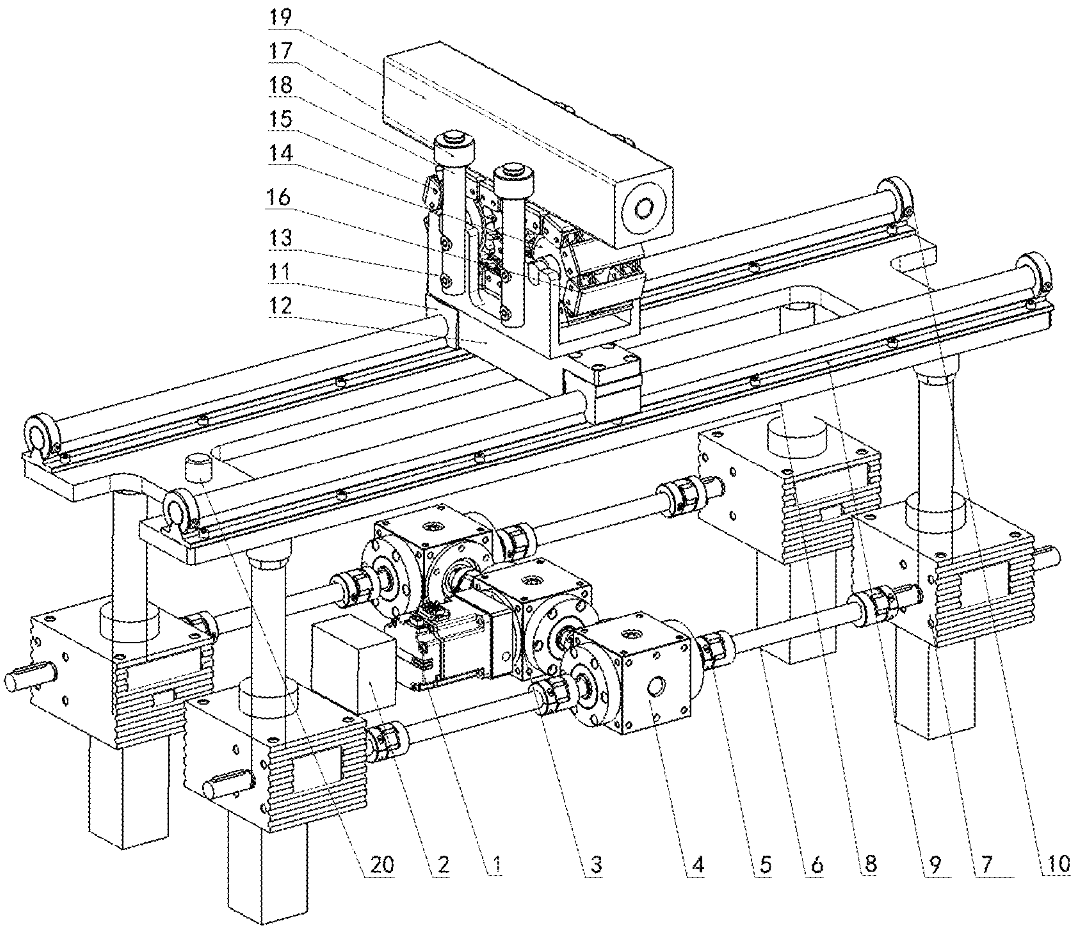
FIG. 1 is a schematic diagram of the structure of the multi-degree-of-freedom conductor depositing system for tokamak toroidal field coil winding packs.

In the drawings, 1-Drive motor; 2-Battery component; 3-Reducer; 4-Commutator 5-Coupling; 6-Transmission rod; 7-Lifter module; 8-Supporting mounting plate; 9-SBR linear guide; 10-Guideway limiter; 11-SBR slider; 12-Circumferential rotation mechanism; 13-Mounting base; 14-Rotating sprocket; 15-Crawler chain; 16-Link plate; 17-Limit roller; 18-Limiting shaft; 19-CICC; 20-Photoelectric proximity switch; 21-Conductor bending unit; 22-Winding table; 23-Multi-degree-of-freedom conductor depositing device; 24-Limiting moulds 25-Coil supporting plate; 26-Superconducting coil after depositing.

DETAILED DESCRIPTION

The technical solutions in embodiments of the present invention are described clearly and completely hereinafter in combination with the drawings in the embodiments of the present invention. Obviously, the described embodiments are only a part of embodiments of the present invention and are not all the embodiments. All other embodiments obtained by those ordinary skilled in the art based on the embodiments in the present invention on the premise of not contributing creative work belong to the protection scope of the present invention.

Figure 2:
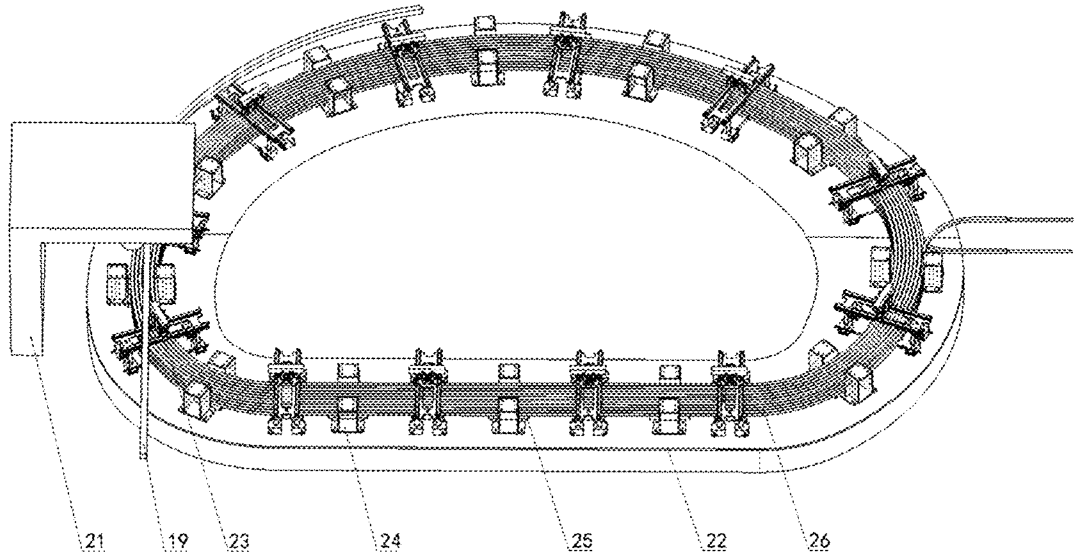
FIG. 2 is a schematic diagram of the mounting structure of the multi-degree-of-freedom conductor depositing system for tokamak toroidal field coil winding packs.

According to the embodiments of the present invention, a multi-degree-of-freedom conductor automatic depositing system for tokamak toroidal field coil winding packs is provided. As shown in FIG. 1 and FIG. 2, the present invention provides a 23-multi-degree-of-freedom conductor depositing device, which includes a lift drive system, a radial movement mechanism, a 12-circumferential rotation mechanism, a 7-lifter module, and a tracked circumferential movement mechanism. Besides, it also comprises: 1-Drive motor; 2-Battery component; 3-Reducer; 4-Commutator; 5-Couplin; 6-Transmission rod; 7-Lifter module; 8-Supporting mounting plate; 9-SBR linear guide; 10-Guideway limiter; 11-SBR slider; 12-Circumferential rotation mechanism; 13-Mounting base; 14-Rotating sprocket; 15-Crawler chain; 16-Link plate; 17-Limit roller; 18-Limiting shaft; 19-CICC; 20-Photoelectric proximity switch; 21-Conductor bending unit; 22-Winding table; 23-Multi-degree-of-freedom conductor depositing device; 24-Limiting moulds; 25-Coil supporting plate; 26-Superconducting coil after depositing.

The lift drive system is used to drive the 7-lifter module to achieve height elevation and includes 1-drive motor, 2-battery component, 3-reducer, 4-commutator, 5-coupling for connecting related components in series, and 6-transmission rod.

The radial movement mechanism is mounted on the 7-lifter module for realizing the radial movement of the CICC depositing process and comprises 8-supporting mounting plate, 9-SBR linear guide, 10-guideway limiter and 11-SBR slider.

The 12-circumferential rotation mechanism is connected to the 11-SBR slider.

The tracked circumferential movement mechanism is used to achieve the movement of the 19-CICC during depositing process, while ensuring radial limitation of the 19-CICC in the tracked circumferential movement mechanism, and comprises 13-mounting base, 14-rotating sprocket, 15-crawler chain, 16-link plate, 17-limit roller, and 18-limiting shaft.

The tracked circumferential movement mechanism is connected to the radial movement mechanism by the 12-circumferential rotation mechanism.

The 1-drive motor is a 36 volt DC driving motor, powered by a 2-battery component. One 1-drive motor is connected in series with one 3-reducer as the driving unit. The driving unit connects two 4-commutators in series through two 5-couplings. The 4-commutator is connected to eight 5-couplings and is connected in series with four 7-lifter modules through a 6-transmission rod. Under the action of the 1-drive motor, synchronous lifting action of four 7-lifter modules is achieved through one 3-reducer and two 4-commutators, and multiple 5-couplings and 6-transmission rods.

The 7-lifter module is respectively connected to the 8-supporting mounting plate, and the 9-SBR linear guide is connected to the 8-supporting mounting plate through bolts, used to achieve the lifting action of the 23-multi-degree-of-freedom conductor depositing device in the height direction, and to achieve the 19-CICC depositing along the spiral direction. The 11-SBR slider is installed on the 9-SBR linear guide and mechanically limited through a 10-guideway limiter to achieve radial movement of the 19-CICC during the depositing process. The 12-circumferential rotation mechanism is installed on the 11-SBR slider and uses oil-free bearings to rotate around the vertical direction. The 15-crawler chain and 14-rotating sprocket form a tracked circumferential movement mechanism and is installed on the 13-mounting base through a pin shaft. The 16-link plate is processed using G10 material and fixed on the 15-crawler chain to support the weight of the 19-CICC and disperse local loads, achieving the movement of the 19-CICC and protecting the insulation tapes. The 17-limit roller is installed on the 18-limiting shaft, and the 18-limiting shaft is installed on the 13-mounting base to ensure that the 19-CICC is always distributed in the center position of the 16-link plate and drives the 19-CICC to move radially along the arc.

The 20-photoelectric proximity switch is installed on the upper surface near the conductor bending unit of the 8-supporting mounting plate. When the 20-photoelectric proximity switch moves below the conductor bending unit, the computer will receive a switch signal from the bending unit. The control system controls all the 23-multi-degree-of-freedom conductor depositing devices to spiral down along the forward direction of the 19-CICC at a pitch of 600 mm, achieving automatic depositing of the 19-CICC.

The 1-driving motor controls the 7-elevator module through the automatic control system and the 20-photoelectric proximity switch, and uses the 2-battery component as the power source.

The 2-battery component is a detachable 36V output lithium battery assembly that serves as the power unit for the 1-drive motor, the 20-photoelectric proximity switch, and the automatic control system.

The 3-reducer is a universal straight tooth reducer that adopts a 'one in two out' drive method. The internal structure adopts a brass grease free drive structure, which ensures the self-lubricating drive of the transmission system and avoids grease contamination during coil winding.

The 4-commutator is a 1:1 bevel gear structure commutator, using a 'one in two out' drive method.

The 5-coupling is a universal flexible coupling that can achieve quick replacement and synchronous transmission The 6-transmission rod is made of stainless steel material to avoid rusting and polluting the on-site environment during use.

The 7-lifter module is a SWL worm gear elevator module, which adopts a 'one driven four' synchronous lifting form. The 7-lifter module and 3-reducer are arranged in an 'H' shape, and the screw rod lifting motion is transmitted during use.

The 8-supporting mounting plate is made of stainless steel and is designed with guide rail installation holes, lifter module connection holes, and photoelectric displacement sensor installation holes. The 8-supporting mounting plate and the 7-lifter module are designed with a snap fit structure to facilitate the disassembly of all the 23-multi-degree-of-freedom conductor depositing devices after the 19-CICC is placed.

The 9-SBR linear guide is made of SBR30 aluminum alloy material, with a length covering the cross-section of the coil to be wound and sufficient safety distance reserved.

The 10-guideway limiter is an SBR30 type limiter, installed at both ends of the SBR30 aluminum alloy linear guiderail to prevent the slider from sliding out of the guiderail beyond the limit position.

The 11-SBR slider is used in conjunction with the 9-SBR linear guide in a straight line to achieve the movement of the 19-CICC along the arc radius direction during the depositing process.

The 12-circumferential rotation mechanism is a combination structure, which rotates through bearings to achieve the vertical rotation of the 13-mounting base, in order to adapt to the possible vertical rotation of the 19-CICC during the depositing process.

The 13-mounting base is made of stainless steel and installed on the 12-circumferential rotation mechanism through a connecting shaft. The 14-rotating sprocket and the 17-limit roller are respectively installed on the 13-mounting base of the track structure through a connecting shaft, achieving the circular motion and radial limit of the 19-CICC along the D-shaped contour.

The 14-rotating sprocket consists of two universal sprockets, which are used in conjunction with the 15-crawler chain. The 14-rotating sprocket is connected to the 13-mounting base through a connecting shaft, and the wheelbase of the sprockets matches the total length of the chain.

The 15-crawler chain is a double row roller chain structure, which is in a pre-tightened state after installation. The 16-link plate made of PE is installed on the pitch of the sprocket. Considering the efficiency of the sprocket, the design between the 15-crawler chain and the 14-rotating sprocket is oil-free and non-lubricated.

The 16-link plate is connected to the 15-crawler chain through a riveting structure. The width of the 16-link plate is consistent with the pitch of the crawler chain, and the length is related to the cross-sectional width of the 19-CICC.

The 17-limit roller is made of stainless steel, connected to the 18-limiting shaft, and is limited by a snap ring to limit the relative position of the 19-CICC and the 16-link plate in the radial direction.

The 18-limiting shaft is made of carbon steel and is connected to the 13-mounting base and the 17-limit roller respectively. The installation height is adjustable to ensure that the 17-limit roller is in the center position of the cross-section of the 19-CICC.

The 19-CICC is a conductor of a D-shaped coil wound by bending, with insulation tapes or a composite structure of insulation and quench detection tapes on its surface.

The 20-photoelectric proximity switch provides the switch signal for the automatic control system. When the 22-winding table moves below the 21-conductor bending unit, the 20-photoelectric proximity switch receives the signal from the 21-conductor bending unit and controls all the 23-multi-degree-of-freedom conductor depositing device to move according to the established program to achieve the function of synchronously depositing the wound 19-CICC along the spiral direction.

As shown in FIG. 2, the present invention is composed of: 21-Conductor bending unit; 22-Winding table; 23-Multi-degree-of-freedom conductor depositing device; 24-Limiting moulds. The 21-conductor bending unit will continuously bend the 19-CICC according to the established process plan. The 22-winding table will move tangentially along the bending wheel of the 21-conductor bending unit, achieving the bearing of the wound 19-CICC. The automatic control system achieves the spiral lifting of the 19-CICC from the outlet end of the 21-conductor bending unit to the inlet end by the 23-multi-degree-of-freedom conductor depositing device through orderly control of the 7-lifter module, thereby realizing the automation and free state depositing of the wound 19-CICC.

The 19-CICC is the conductor of the D-shaped coil, and the 21-conductor bending unit is a specialized bending equipment for the D-shaped coil winding line. The 21-conductor bending unit is manufactured using the three-roll-bending principle and can complete the continuous bending of multiple arc segments of the 19-CICC according to the different contours of the D-shaped coil. The 22-winding table can achieve horizontal movement and vertical rotation functions, and is used to follow the trajectory of the winding pack and bear the weight of the wound 19-CICC. The 23-multi-degree-of-freedom conductor depositing device is uniformly installed on the 22-winding table along the contour, achieving free depositing of the wound 19-CICC in the circumferential, radial, and height directions. The 20-photoelectric proximity switch on the 23-multi-degree-of-freedom conductor depositing device is used to detect the relative position between the 22-winding table and the 21-conductor bending unit. The obtained switch signal is used to control the motor to drive the 7-lifter module to lift according to the established process plan. The automatic control system ensures that the 23-multi-degree-of-freedom conductor depositing device located at the exit position of the 21-conductor bending unit is at the highest position of the load-bearing 19-CICC, and the 23-multi-degree-of-freedom conductor depositing device close to the 21-conductor bending unit is at the lowest position of the load-bearing 19-CICC. The remaining 23-multi-degree-of-freedom conductor depositing devices are distributed in a spiral pattern along the rotation direction of the 22-winding table. When the 23-multi-degree-of-freedom conductor depositing device approaches the 21-conductor bending unit, manual intervention and disassembly of the 8-supporting mounting plate are required. The 26-superconducting coil after depositing is contour limited using 24-limiting moulds, and the weight of the 26-superconducting coil after depositing is borne by the 25-coil supporting plate.

The 22-winding table has the functions of X-axis, Y-axis movement, and Z-axis rotation, which always moves tangentially with the 21-conductor bending unit. It is used to follow the trajectory of the D-shaped coil winding movement and bear the weight of the 19-CICC continuously wound by the 21-bending unit.

The 23-multi-degree-of-freedom conductor depositing device is composed of multiple components and has functions of height lifting, circumferential rotation, and radial movement. It can detect the relative position between the 22-winding table and the 21-conductor bending unit through the 20-photoelectric proximity switch, and control its lifting to achieve automatic depositing of the 19-CICC.

The 24-limiting moulds are made of stainless steel and are divided into inner and outer moulds. They are installed on the 22-winding table according to the dimensions of the inner and outer contours of the D-shaped coil, and are used to limit the overall contour of the 26-superconducting coil after depositing.

The 25-coil support plates are manufactured by G10 and are distributed between the 24-limiting moulds to bear the weight of the coil and avoid direct contact between the

26-superconducting coil after depositing and the 22-winding table, which may contaminate the surface of the 19-CICC.

The 26-superconducting coil after depositing is a multi-turn conductor formed by winding and completed depositing. It can be a conductor that has already been deposited during the winding process, or a coil winding that has been completed and is ready for hoisting.

It will be understood by those skilled in the art that the foregoing is only an exemplary embodiment of the present invention, and is not intended to limit the invention to the particular forms disclosed, since various modifications, substitutions and improvements within the spirit and scope of the invention are possible and within the scope of the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A multi-degree-of-freedom conductor depositing system for tokamak toroidal field coil winding packs, comprising:

a conductor bending unit;

a winding table;

multi-degree-of-freedom conductor depositing devices on the winding table;

limiting moulds on the winding table; and an automatic control system, wherein:

the conductor bending unit configured to bend and form a cable-in-conduit conductor (CICC) continuously;

the winding table configured to move along forming wheels of the conductor bending unit to carry the formed CICC;

the multi-degree-of-freedom conductor depositing devices comprise:

a lift drive system, radial movement mechanisms, circumferential rotation mechanisms, lifter modules and tracked circumferential movement mechanisms;

a tracked ring direction moving mechanism, wherein the lift drive system lifts the lifter module; the radial movement mechanism moves the CICC in a radial direction; the tracked circumferential movement mechanism moves the CICC in a circle while keeping it from moving in any other direction; the tracked ring direction moving mechanism is mounted on the circumferential rotation mechanism, which is mounted on the radial movement mechanism; the automatic control system controls the lifter module, which lifts the CICC from the conductor bending unit to an inlet, which allows the CICC to drop onto the winding table, wherein a radial movement mechanism of the radial movement mechanisms includes two stainless steel linear guides and a slider as driving components, enabling the CICC to move radially along an arc;

wherein the tracked circumferential movement mechanism comprises:

a crawler chain, a rotating sprocket, a mounting base, a link plate, and a limit roller, and wherein the crawler chain is made of oil-free roller chain, the rotating sprocket is made of stainless steel and is mounted on the mounting base through the rotating sprocket shaft, and the link plate is made of garolite to reduce pressure between the conductor and the tracked circumferential movement mechanism.

2. The multi-degree-of-freedom conductor automatic depositing system for tokamak toroidal field coil winding packs according to claim 1, wherein:

the lifter module comprises a drive motor, which is rechargeable;

the drive motor provides a driving force for the CICC to rise and fall after it has been bent; and power replacement is accomplished by means of replacing the battery.

3. The multi-degree-of-freedom conductor automatic depositing system for tokamak toroidal field coil winding packs, according to claim 1, wherein the lifter module drives four turbolifts via a drive motor to achieve simultaneous rise and fall.

4. The multi-degree-of-freedom conductor automatic depositing system for tokamak toroidal field coil winding packs according to claim 1, wherein:

the circumferential rotation mechanism is made of stainless steel and connected to two sliders;

the circumferential rotation mechanism has a hole in the center and is fitted with oil-free deep groove ball bearings; and a rotating shaft of the mounting base is mounted within the oil-free deep groove ball bearings to rotate around the vertical direction.

5. The multi-degree-of-freedom conductor automatic depositing system for tokamak toroidal field coil winding packs according to claim 2, further comprising a photoelectric proximity switch, wherein the photoelectric proximity switch is configured to receive a switching quantity signal mounted at the bottom of the winding table, and by controlling the rotation of the drive motor, to achieve the rise and fall of the lifter module, and to complete the depositing of the bent CICC into the limiting mould.

* * * * *